United States Patent [19]

Diederichs

[11] 4,263,524
[45] Apr. 21, 1981

[54] ELECTRIC TWO MOTOR DRIVE

[75] Inventor: Arthur Diederichs, Würzburg, Fed. Rep. of Germany

[73] Assignee: Siemens Aktiengesellschaft, Berlin & Munich, Fed. Rep. of Germany

[21] Appl. No.: 943,754

[22] Filed: Sep. 19, 1978

[30] Foreign Application Priority Data

Sep. 19, 1977 [DE] Fed. Rep. of Germany ....... 2742102

[51] Int. Cl.³ .............................................. H02K 7/20
[52] U.S. Cl. ................................. 310/112; 310/173; 310/184; 310/198
[58] Field of Search .......................... 318/46, 47, 50; 310/112, 114, 184, 185, 198, 173

[56] References Cited

U.S. PATENT DOCUMENTS

| 1,361,546 | 12/1920 | Politowski | 310/185 X |
|---|---|---|---|
| 1,551,347 | 8/1925 | Trombetta | 310/67 X |
| 2,054,678 | 9/1936 | Merrill | 310/112 |
| 3,840,764 | 10/1974 | Burger | 310/185 |
| 4,081,726 | 3/1978 | Brimer et al. | 310/268 X |

Primary Examiner—Donovan F. Duggan
Attorney, Agent, or Firm—Kenyon & Kenyon

[57] ABSTRACT

An electric two motor drive is disclosed in which the field winding of a commutator motor having few poles and the stator winding, distributed in slots, of an induction motor having a larger number of poles are both arranged on a common stator lamination stack. The field winding is wound around part of the circumference of the stator lamination stack in the manner of a concentrated ring armature winding. Either a closed or an open stator lamination stack may be provided.

The invention is applicable particularly to a two speed motor drive for an automatic washing machine having a single lamination stack for the series and induction motor windings.

5 Claims, 5 Drawing Figures

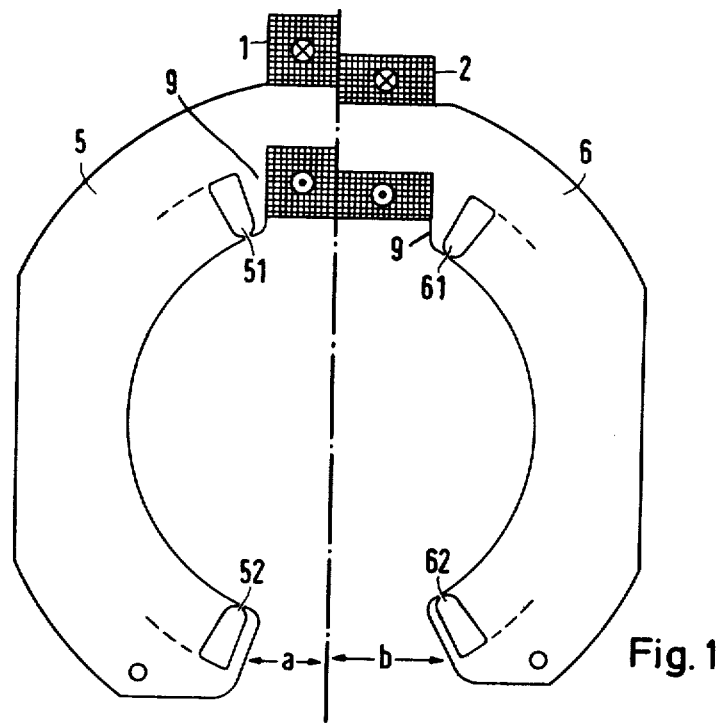
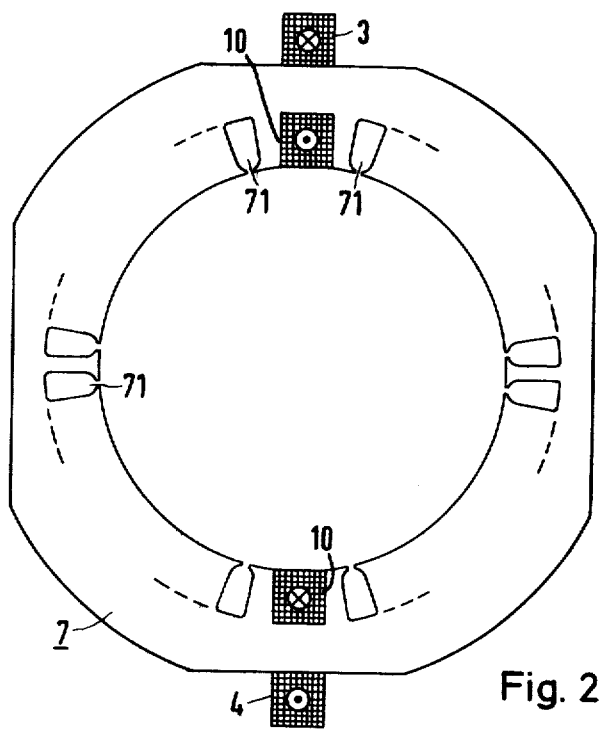
Fig. 1
Fig. 2

ELECTRIC TWO MOTOR DRIVE

BACKGROUND OF THE INVENTION

This invention relates to an electric two motor drive. More particularly, it relates to the construction of a stator for use in a motor having the field winding of a commutator motor with a small number of poles, two at least, and the stator winding, distributed in slots, of an induction motor with a larger number of poles, and in which both windings are arranged on a common lamination stack.

In one electric two motor drive of this type (See German Offenlegungsschrift No. 25 30 294), 36 slots are arranged uniformly, but with unequal slot cross section, over the inner circumference of the stator lamination stack and the winding of the induction motor is uniformly distributed in all the slots; the winding of the series motor occupies some of the slots, and these only partially. For this purpose, the slots in this region have larger slot cross sections than those other slots which are occupied by the winding of the induction motor alone. Both windings are arranged so that the sides of all coils run axially through the slots with the coils being interconnected at the end faces, forming coil heads in front of either the stator lamination stack or the rotor bore space where there is no shaft.

In another two motor drive (See German Offenlegungsschrift No. 25 01 300) which has a multiple-pole induction motor winding and a two-pole commutator motor winding insulated therefrom, the stator lamination stack is provided with discrete main poles on its inner circumference around which the field winding of the commutator motor part is arranged, while the stator winding of the induction motor part is accommodated in slots under the pole pieces of the main poles.

It is an object of the present invention to reduce the cost of fabricating and, in particular, of winding the stator of an electric two motor drive of the type mentioned above.

BRIEF SUMMARY OF THE INVENTION

According to the invention, this problem is solved by winding the field on part of the circumference of the stator lamination stack in the manner of a concentrated ring armature winding. Thus, by means of a simple cut in the laminations of the stator stack, it is possible to apply the field winding in a manner largely independent of the second winding of the induction motor which must be placed on the same stator lamination stack.

In an embodiment of the invention having a closed stator lamination stack, the exciting field is formed in zones or regions, each having one part of the field winding, which are placed 180° apart from each other on the rotor stack circumference. In the case of an open stator lamination stack, a field excitation pole pair is formed by a single field winding coil wound on the stator lamination stack at a point 180° around the circumference from the opening.

It is a feature of the above-mentioned embodiments that the field winding can be wound on the stator lamination stack before or after, and independently of, the application of the induction motor winding.

The stator lamination stampings used in the first of the above mentioned, previously known, electric two motor drives can also be used for the present invention if the stator winding of the induction motor is uniformly distributed in all slots at the circumference of the stator lamination stack and if each part of the field winding is subdivided into coils which are placed in the appropriate zone, one side of each coil being placed in each of the correspondingly enlarged slots along with the induction motor stator winding.

A further simplification of the lamination punching used for the stator lamination stack can be obtained by winding the induction motor winding on only a portion of the stator lamination stack. Thus, in the case of a closed lamination stack, two field excitation forming zones spaced apart 180° and left free of induction motor winding each support a part of the commutator motor field winding; each zone thus forms a pole pair. In the case of an open lamination stack, the field winding is placed in a single, induction motor winding free zone. A still further reduction in cost is afforded by providing uniformly spaced slots around the entire circumference and placing one side each of the coils which together make up the field winding in those slots left free of induction motor stator winding so as to form the field producing zone. If on the other hand, there is to be no subdivision of the field winding into separate coils, unslotted pole gaps are cut into the stator lamination stack in the commutator winding free regions into which one coil side of the concentrated ring armature winding is wound.

A particularly advantageous application of two speed electric motor drives built according to this invention is found in the drive for an automatic washing machine where the line voltage is supplied to the stator winding and the motor functions as an induction motor during washing operation and during spinning operation, the line voltage goes to the field winding and operation as a commutator motor results. It is a further feature of the invention that, during washing operation, when the motor is in low pole operation, the best possible full utilization of the available magnetic circuit and copper in the winding may be obtained by connecting or reconnecting the high pole field winding in the direction of aiding the low pole excitation.

BRIEF DESCRIPTION OF THE DRAWINGS

FIG. 1 is a view, in cross-section, of half portions of two open stator lamination stacks each having a single field winding according to the teachings of the invention.

FIG. 2 is a view, in cross-section, of a lamination stack to be used as a closed stator and having part of the field winding in each of two pole gaps.

DETAILED DESCRIPTION OF THE INVENTION

Figure 3:
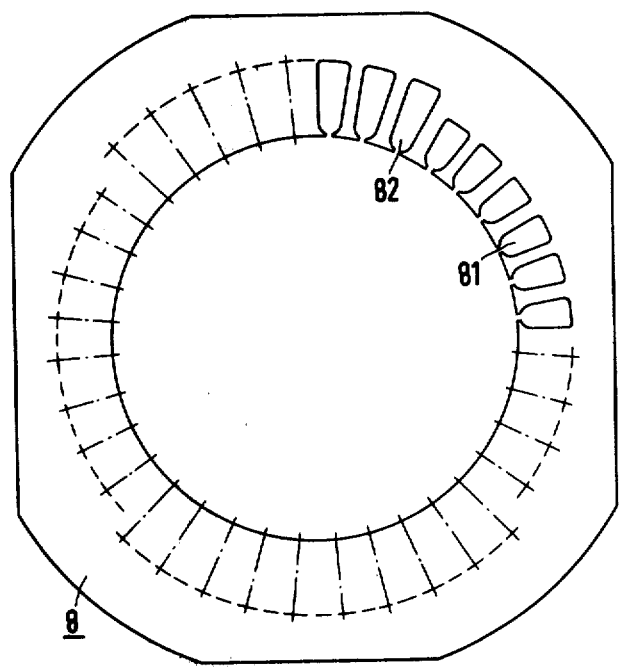
FIG. 3 is a view, in cross-section, of a stator lamination stack having uniformly distributed slots of differing cross-sectional areas.

Reference is made to FIG. 1 where the open stator lamination stacks 5 and 6 are shown, each stack being provided with a single field winding part 1 and 2, respectively. The outer coil sides of the field winding parts 1 and 2 rest against the stator lamination stack on the outside, while the inner coil sides of the field winding parts 1 and 2 are received in pole gaps 9 cut into the inner circumference of the stator lamination stack. The regions containing pole gaps 9 are left free of induction motor winding slots 51, 52, and 61, 62 like those shown in the remaining portions of the respective stator lamination stacks. There is an opening in each stator lamination stack in a region displaced 180° around circumference from the field winding parts 1 and 2, the opening being double the distance marked "a" in the drawing, in the case of stator stack 5, and "b", in the case of stack 6. This aperture makes it possible to make the field winding in ring armature winding form on the stator lamination stack in a simple manner. The field winding 1 differs from the field winding 2 only by its greater overall height; thus, if only limited installation space is available, such as when the motor is to be installed in an automatic washing machine, the required height of the stator lamination stack with the ring armature winding in place may be reduced by a compensatory widening of the winding to extend it over a larger portion of the circumference of the stator lamination stack as shown in the drawing.

FIG. 2 shows a closed stator lamination stack 7 with zones for creating the pole pairs spaced 180° relative to each other. Thus, with one field winding part 3 and 4 for each zone, the field excitation is provided by two pole pairs. The inside sides of the field winding parts 3 and 4 are placed in pole gaps 10 in the inner circumference of the stator lamination stack. Pole gaps 10 are usually much larger than the induction motor winding slots 71 which are distributed over the remaining part of the inner circumference of the stator. No induction motor winding is placed in the pole gaps 10 provided for the field winding parts 3 and 4. In order to achieve optimum utilization of the magnetic circuit, it may be advantageous to arrange the field winding parts 3 and 4 in the full part of the stator lamination stack rather than the flattened or cut away part shown in FIG. 2.

FIG. 3 shows a stator lamination punching 8 having a series of slots 81, 82 uniformly spaced around over the entire inside circumference; as shown, however, slots 82, which are located in opposing areas of the flattened stator laminations, are deeper, radially, and so provide a larger cross-sectional area. The deepest parts of slots 82 each contain one side of a coil the other side of which is situated on the flattened portions of the outer circumference of stator lamination stack 8. Taken together, the coils function like the field windings of FIGS. 1 and 2. The induction motor winding is evenly distributed in all slots 81 and 82 around the full circumference of the stack.

Figure 4:
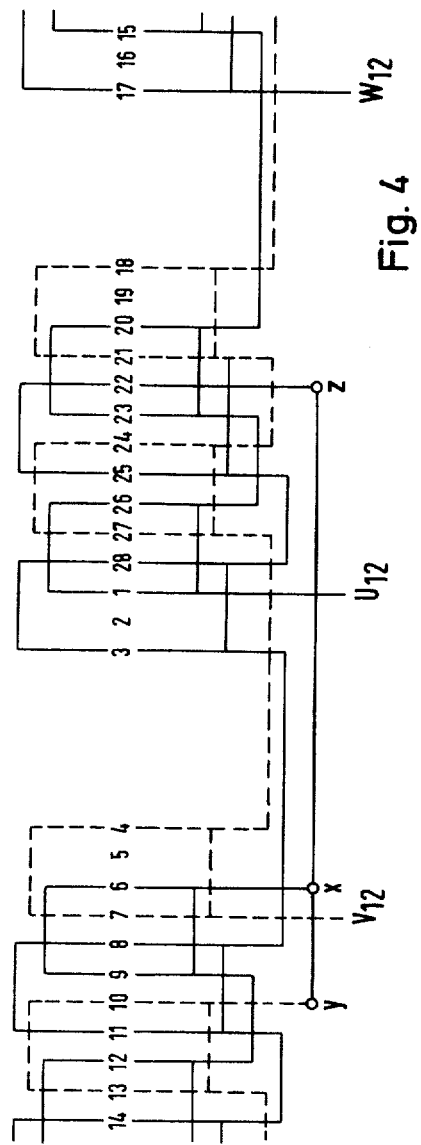
FIGS. 4 and 5 illustrate, schematically, two different winding plans for providing winding gaps in the induction motor winding to receive the field windings.
Figure 5:
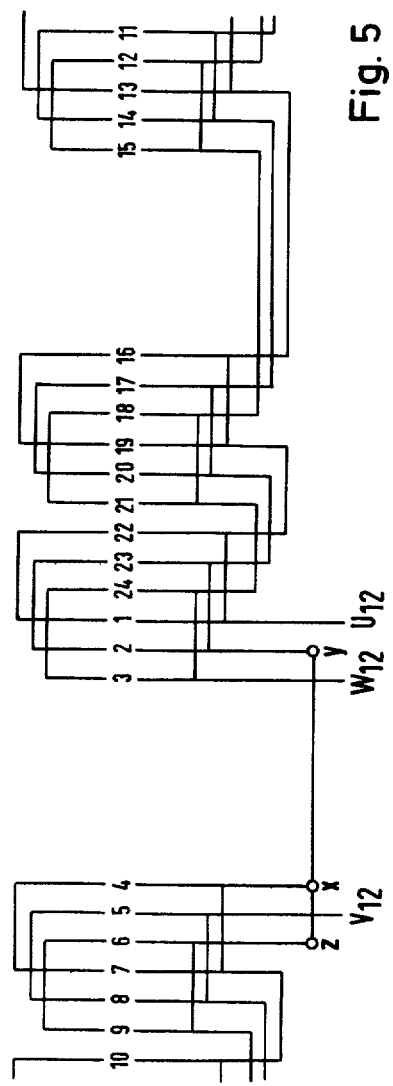

FIGS. 4 and 5 each show a winding plan for the stator winding of a 12-pole, 3-phase induction motor. The two views show two different possibilities for forming "winding gaps", in which ring armature winding elements of the field winding provided in accordance with the invention can be accommodated. Both cases therefore represent a stator lamination stack in which the entire circumference is not occupied by the induction motor winding but, rather, in which the field winding alone is accommodated in zones established by separate pole gaps or by slots cut in the laminations which are free of induction motor winding. As can be seen from the two illustrations without further explanation, the excitation patterns of a 12-pole, 3-phase induction motor in which the winding of the induction motor is uniformly distributed in uniformly spaced slots around the circumference are obtained in spite of the winding gaps. ($N = 2p.m.g = 2.6.3.1 = 36$; where $p$ = number of pole pairs; $m$ = number of phases; $g$ = number of slots per pole and phase.)

What is claimed is:

1. In a stator for use in an electric two motor drive, the stator including a stator lamination stack; a commutator motor field winding having a small number of poles, such as two, disposed on the lamination stack; and an induction motor winding having a larger number of poles distributed in slots in the stack, the improvement comprising;

the lamination stack having an air gap and a single field excitation winding carried on a region of the circumference of the stack at a location 180° around the circumference away from the gap, the field winding being in the form of a concentrated ring armature winding.

2. The improvement according to claim 1 in which the induction motor stator winding is so distributed on the stator lamination stack that at least one region on the stack is left free of stator winding, and in which each region so provided carries a coil for the exciting field of the commutator motor.

3. The improvement according to claim 2 in which the entire circumference of the stator lamination stack is provided with uniformly spaced slots and in which the slots in a region free of stator winding each contain one side of a coil forming part of the field winding.

4. The improvement according to claim 2 in which one side of the concentrated ring armature winding is placed in a pole gap cut in each region on the stator lamination which is left free of induction motor stator winding.

5. In a stator for use in an electric two motor drive, the stator including a stator lamination stack; a commutator motor field winding having a small number of poles, such as two, disposed on the lamination stack; and an induction motor winding having a larger number of poles distributed in slots in the stack, the improvement comprising;

the induction motor stator winding being distributed uniformly in slots around the circumference of the stator lamination stack, and the field winding being wound on the stack in the form of a concentrated ring armature winding and subdivided into coils placed in enlarged slots along with parts of the induction motor stator winding in the field winding regions of the stator stack.

* * * * *